US009938456B2

(12) United States Patent
Molard et al.

(10) Patent No.: US 9,938,456 B2
(45) Date of Patent: Apr. 10, 2018

(54) HYBRID POLYMER WITH HIGH CLUSTER CONTENT

(71) Applicants: Universite de Rennes 1, Rennes (FR); Centre National de la Recherche Scientifique, Paris (FR)

(72) Inventors: Yann Molard, Acigne (FR); Maria De Los Angeles Amela-cortes, Acigne (FR); Stephane Cordier, Plelan le Petit (FR)

(73) Assignees: Universite de Rennes 1 (FR); Centre National de la Recherche Scientifique (CNRS) (FR)

( * ) Notice: Subject to any disclaimer, the term of this patent is extended or adjusted under 35 U.S.C. 154(b) by 0 days.

(21) Appl. No.: 14/761,164

(22) PCT Filed: Jan. 15, 2014

(86) PCT No.: PCT/EP2014/050739

§ 371 (c)(1),
(2) Date: Jul. 15, 2015

(87) PCT Pub. No.: WO2014/111435

PCT Pub. Date: Jul. 24, 2014

(65) Prior Publication Data

US 2015/0344773 A1 Dec. 3, 2015

(30) Foreign Application Priority Data

Jan. 15, 2013 (EP) .................................... 13305039

(51) Int. Cl.
*C09K 11/06* (2006.01)

(52) U.S. Cl.
CPC .......... *C09K 11/06* (2013.01); *C09K 2211/10* (2013.01); *C09K 2211/1044* (2013.01);
(Continued)

(58) Field of Classification Search
USPC .................................. 526/241, 240; 524/780
See application file for complete search history.

(56) References Cited

U.S. PATENT DOCUMENTS 5,589,537 A * 12/1996 Golden .................. B82Y 10/00 524/779

FOREIGN PATENT DOCUMENTS

| | | | |
|---|---|---|---|
| EP | 0203532 | A2 | 12/1986 |
| JP | S62-053944 | A | 3/1987 |
| JP | 2013-004217 | A | 1/2013 |

OTHER PUBLICATIONS

Adamenko et al., "Luminescence of Salts and Copolymers containing the (Mo116Cl8)4+ Cluster", Russian Chemical ulletin, International Edition, vol. 51, No. 6, 994-997, Jun. 2002.*

(Continued)

*Primary Examiner* — Mark Kaucher
*Assistant Examiner* — Henry Hu
(74) *Attorney, Agent, or Firm* — Banner & Witcoff, Ltd.

(57) ABSTRACT

This deals with a luminescent salt comprising a metal cluster anion and an organic cation, wherein the metal cluster anion comprises a metal cluster with at least two metal atoms, and ligands, the metal atoms being chosen from the group consisting of molybdenum, rhenium, tungsten, thallium, niobium, and mixtures thereof, wherein the organic cation comprises a cationic head substituted by at least one substituent including a polymerizable functional group. It also deals with a polymeric material comprising a polymer matrix which has polymerized with this luminescent salt.

23 Claims, 5 Drawing Sheets

(52) U.S. Cl.
CPC .... *C09K 2211/14* (2013.01); *C09K 2211/181* (2013.01); *C09K 2211/183* (2013.01); *C09K 2211/188* (2013.01)

(56) References Cited

OTHER PUBLICATIONS

Song et al., "Recent advances on polyoxometalate-based molecular and composite materials", Chem. Soc. Rev., vol. 41, pp. 7384-7402, Apr. 2012.*

Shriver et al., "Synthesis and Photophysical properties of Polymer-Bound Hexanuclear Molybdenum Clusters", Journal of Coordination Chemistry., vol. 37, No. 1-4, pp. 119-129 (1996).*

Adamenko et al., "Luminescence of Salts and Copolymers containing the (Moll6Cl8)4+ Cluster", Russian Chemical Bulletin, International Edition, vol. 51, No. 6, 994-997, Jun. 2002.*

Summers et al., "Polymerization of Cationic Surfactant Phases", Langmuir 5388-5397, 2001.*

Backer et al., "Crystalline and Liquid Crystalline Organic-Inorganic Hybrid Salts with Cation-Sensitized Hexanuclear Molybdenum Cluster Complex Anion Luminescence", Eur. J. Inorg. Chem., 4089-4095, Sep. 1, 2011.*

International Search Report and Written Opinion issued in corresponding International Application No. PCT/EP2014/050739, dated Mar. 3, 2014.

Adamenko et al., "Synthesis, Structure, and Physicochemical Properties of [Mo6Cl8]4+-Containing Clusters" Doklady Physical Chemistry, 275-278, 381, 2001.

N. D. Golubeva et al., "Synthesis, Structure, and Properties of New Hybrid Nanocomposites Containing the [Mo6(u3-Cl8)]4+ Cluster1", Inorganic Materials, vol. 40, No. 3, 306-313, 2004.

Bäcker et al., "Crystalline and Liquid Crystalline Organic-Inorganic Hybrid Salts with Cation-Sensitized Hexanuclear Molybdenum Cluster Complex Anion Luminescence", Eur. J. Inorg. Chem., 4089-4095, Sep. 1, 2011.

Cotton, "Metal Atom Clusters in Oxide Systems", Inorganic Chemistry, vol. 3, No. 9, September, 1217-1220, 1964.

Golden et al., "Monodisperse Metal Clusters 10 Angstroms in Diameter in Polymeric Host: The "Monomer as Solvent Approach"", Science vol. 268, 1463-1465, Jun. 1995.

Moore et al., "Organoimido-Polyoxmetalates as polymer pendants", Chem. Soc. Rev., 1793-1794, Aug. 2000.

Proust et al., "Functionalization and post-functionalization: a step towards polyoxometalate-based materials", Chem. Soc. Rev., 7605-7622, Apr. 2012.

Shriver et al., "Synthesis and Photophysical properties of Polymer-Bound Hexanuclear Molybdenum Clusters", Chem. Soc. Rev., 119-129, Feb. 1996.

Song et al., "Recent advances on polyoxometalate-based molecular and composite materials", Chem. Soc. Rev., 1384-7402, Apr. 2012.

Zheng et al., "An Inorganic-Organic Hybrid Composite Featuring Metal-Chalcogenide Clusters", Journal of Cluster Science, vol. 14, No. 4, 449, Dec. 2003.

* cited by examiner

HYBRID POLYMER WITH HIGH CLUSTER CONTENT

RELATED APPLICATION DATA

This, application is a National Stage Application under 35 U.S.C. 371 of co-pending PCT application number PCT/EP2014/050739 designating the United Stoics and filed Jan. 15, 2014; which claims the benefit of EP application number 13305039.3 and filed Jan. 15, 2013 each of which are hereby incorporated by reference in their entireties.

TECHNICAL FIELD

This deals with the technical field of integration of metal clusters at high or very high concentration in a polymeric matrix. More in particular, it deals with luminescent metal clusters that retain their luminescent properties and that can be integrated at high or very high concentration into a polymeric matrix.

PRIOR ART

The integration of clusters into a host matrix, more in particular polymeric matrix, is already known. However, although the clusters are obtained by well-known solid-state chemistry techniques (solid gas or solid/solid reactions, high-temperature reactions), their ceramic like behaviour (hard, fragile, non-ductile) has until now seriously restrained their use in applicative devices in particular in optical technology.

For example, it is known to disperse octahedral metal clusters in a polymer matrix by reduction with a "monomer as solvent" approach. In this approach, six weakly bound apical triflate (OTf) ligands of an octahedral molybdenum cluster unit, namely $[Mo_6O_8(OTf)_6]^{2-}$, are substituted with N-vinylimidazole (NVI) monomer moieties yielding $[Mo_6Cl_8(NVI)_6].(OTf)_4$. After substitution, $[Mo_6Cl_8(NVI)_6].(OTf)_4$ is dispersed in labile NVI monomer at a concentration of 0.1 or 0.5 mol/L. Then, the modified molybdenum cluster and NVI are copolymerised by a radical process using 2,2'-azobis(isobutyronitrile) (AIBN) (Golden et al., in *Science,* 1995, 268, 1463).

This is also described in U.S. Pat. No. 5,589,537, which also mentions $[Co_3(CO)_9(C_9H_7)]$ and $[Rh_{22}(CO)_{34}(NVI)_3]$ as examples of metal clusters bound to polymerisable ligands. Examples of metal cluster cations include $[Nb_6Cl_8(4\text{-vinylpyridine})_6]^{4+}$, $[Ta_6Cl_8(\text{acrylamide})_6]^{4+}$, $[Pt_{38}(CO)_{40}(4\text{-vinylpyridine})_4H^2]^{2+}$, $[Au_{13}(\text{p-dimethylphenylvinyl})_{10}Cl_2]^{3+}$ and the like. Examples of suitable anions to use with these cations include $PF_6$, $(BPh_4)_4^{4-}$, $SO_4^{2-}$ and $BPh_4^{4-}$, wherein Ph is phenyl.

These metal cluster units can be easily dissolved and homogeneously dispersed within the polymerisable organic solvent. This is believed to be due to the polymerisable organic solvent's capacity to coordinate with or solvate the metal cluster unit.

The major drawback of these compounds is linked to the number of polymerisable ligands which are strongly coordinated to the metal cluster without possibility for spatial rearrangement. This limits the amount of metal clusters that can be incorporated into the polymer matrix. Indeed, in higher concentration, too much cross-linking reactions (reticulation) will occur, what impede processability. Further, apart from $[Mo_6Cl_8NVI_6]^{4+}$ that can be luminescent, the others are not.

Adamenko et al. (in *Doklady Physical Chemistry,* 2001, 381, 275; in *Russian Chemical Bulletin,* 2002, 51, 994; in *Inorg. Mater.,* 2004, 40, 306) used the same approach by replacing some of the six labile trifluoroacetate ($CF_3COO^-$) ligands of $[Mo_6Cl_8(CF_3COO)_6]^{2-}$ with acrylate moieties ($CH_2CHCOO^-$) to obtain $[Mo_6Cl_8(CF_3COO)_{6-n}(CH_2CHCOO)_n]^{2-}$, with n equals 1 to 3. The obtained complex is then copolymerised with methacrylic acid. However, luminescent properties of the metal cluster were lost after ageing because of some degradation induced by the lability of the $CF_3COO^-$ ligands.

Shriver et al. (in *J. Coord. Ahem.,* 1996, 37, 119) coordinated $[Mo_6O_8(OTf)_6]^{2-}$ and $[Mo_6Cl_8^iCl_4^a(EtOH)_2^a]$ (i indicating inner ligands and a apical ligands) to poly(vinylpyridine) to produce cross-linked materials. Transient emission spectroscopy revealed that polymer bound hexatriflate clusters lack the luminescent properties characteristic of many $[Mo_6Cl_8]^{4+}$-based clusters while the other ones display luminescence. However, unswellable materials with no discernible glass temperature $T_g$ are obtained with cluster/polymerisable ligand ratios of 1:5 and lower, indicating a high degree of cross-linking and, thus, the lack of processability.

The introduction of a monofunctionalised octohedral rhenium cluster ($Re_6$) in the side chain of polystyrene strands by copolymerisation between styrene and vinylpyridine coordinated to the cluster has been described by Zhang et al. (in *J. Cluster Sci.,* 2003, 14, 449). However, the luminescence properties of this hybrid were not reported probably because the introduction of phosphine ligands around a $Re_6$ cluster induces a drastic decrease in its luminescence quantum yield.

SUMMARY

One aim of the present development is to overcome at least one of the drawbacks of the prior art presented above.

To this aim, a luminescent salt is provided. This luminescent salt comprises a metal cluster anion and an organic cation, wherein the metal cluster anion comprises a metal cluster with at least two metal atoms, the metal atoms being chosen amidst molybdenum, rhenium, tungsten, thallium and niobium, wherein the organic cation comprises a cationic head substituted by at least one substituent including a polymerisable functional group.

It was surprisingly found that using a metal cluster anion bound to a polymerisable moiety by ionic bonds enables the metal cluster to be incorporated into an organic matrix in weight contents of 10% and above. The resulting polymeric material stays soluble. Therefore, the resulting polymeric material remains easily processable like the polymerisable moiety alone. Furthermore, using this luminescent salt, the metal cluster is homogeneously dispersed throughout the polymer matrix without any phase segregation even at high contents (above 10% by weight) and retains its luminescence properties. These are due to the fact that the ionic bond between the metal cluster anion and the organic cation bearing the polymerisable functional group provides more flexibility for the positioning of the polymerisable function group since the organic cation can move around the metal cluster. This counters the cross linking effect resulting in a retained solubility of the material.

A polymeric material comprising a polymer matrix which has polymerised with the luminescent salt described above is also provided.

It is also provided a use of the luminescent salt described above as luminescent probes for detecting gaseous oxygen concentrations ranging from about 0.09% to 90% at 1 atm.

It is also provided a use of the luminescent salt described above as luminescent probes for medical processes such as in situ cells visualisation and monitoring drug relieves.

It is also provided a use of the luminescent salt described above in optoelectronic and photonic components such as light source, in optic amplifier, laser source, etc. or as light absorbing compound in protective glasses, for example absorbing light with wavelength below 540 nm.

It is also provided a use of the luminescent salt described above as photovoltaic improver for manufacturing converter layers suitable for solar cells and photovoltaic systems.

It is also provided a use of the luminescent salt described above as photocatylists for industrial processes.

DRAWINGS

DESCRIPTION

Figure 1:
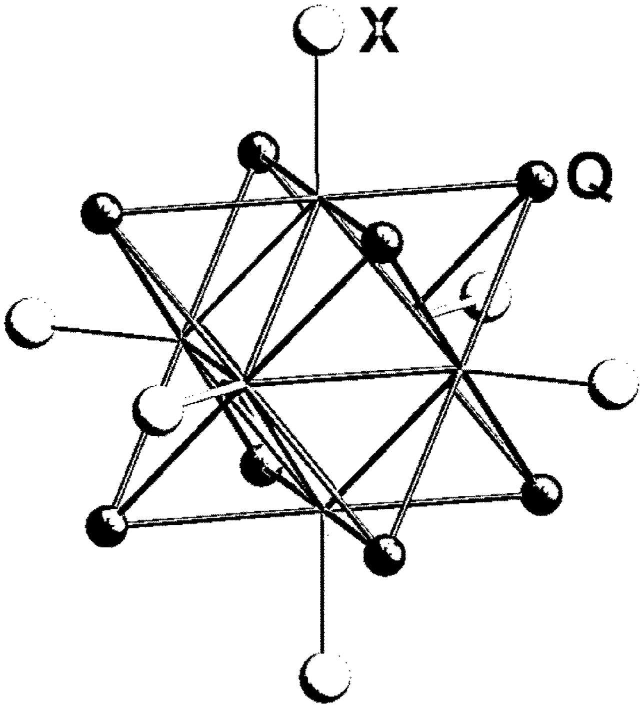
FIG. 1 is a schematic representation of a cluster unit, the metal cluster of which comprises six metal atoms (the octahedron), surrounding by eight face-capping ligands (black beads) and six apical ligands (white beads).

Luminescent Salt Except when stated otherwise, wordings “one or more” and “one or two” should be interpreted as meaning “one or more identical or different” and “one or two identical or different”.

A luminescent salt is described hereafter.

Luminescence is emission of light by a substance not resulting from heat; this distinguishes luminescence from incandescence, which is light emitted by a substance as a result of heating. It is, thus, a form of cold body radiation. The energy of the electrons shifts upon excitation before going back to its base level. When the electrons return to their base level of energy, light is emitted. Fluorescence is luminescence wherein light emission occurs right after excitation, usually $10^{-9}$ to $10^{-6}$ s after the excitation. Phosphorescence is luminescence wherein light emission occurs after a longer lapse of time from the excitation, usually $10^{-3}$ to 10 s.

By “salt”, it is understood a compound composed of one or more cations and one or more anions so that the product is electrically neutral.

This luminescent salt comprises a metal cluster anion and at least one organic cation.

The metal cluster anion comprises a metal cluster with at least two metal atom.

Definition of a metal cluster is given by F. A. Cotton in *Inorg. Chem.* 1964, 3, 1217 as: “a finite group of metal atoms that are held together mainly, or at least to a significant extent, by bonds directly between the metal atoms, even though some non-metal atoms may also be intimately associated with the cluster”.

In the following description, “metal cluster” is understood as at least two metal atoms which are covalently bound together and form metal-metal bonds. Metal-metal bonds enable delocalisation of all valence electrons on all metal atoms. The metal atoms of the metal cluster form a polyhedron. Each metal atom is considered as occupying a vertex (corner point) of the polyhedron.

The metal cluster anion may comprise at least face-capping ligands and/or edge bridging ligands, together referred as inner ligands.

A “ligand” is an ion or molecule that binds to the metal cluster to form a coordination complex. The bonding between the metal cluster and the ligand usually involves formal donation of one or more of the ligand’s electron pairs.

“Face-capping ligands” are ligands that are located normally to the centre of one face of the polyhedron, i.e. the virtual line passing through the ligand and the centre of the face of the polyhedron is orthogonal to that very face.

“Edge-bridging ligands” are ligands that are located normally to the middle of a metal-metal bond, i.e. the virtual line passing through the ligand and the middle of the metal-metal bond is perpendicular to that very metal-metal bond.

The metal cluster anion can comprise apical ligands.

“Apical ligands” are ligands located facing the vertexes of the polyhedron. The metal cluster and the inner ligands are referred together in the description as a “cluster core”. The cluster core and the apical ligands are referred together as a “cluster unit”.

The metal cluster has a nanometric size, preferably between about 0.5 nm to about 20 nm, more preferably between about 0.5 nm to about 2 nm.

For example, the metal cluster anion has the following formula:

$$[M_aQ_bX_c]^{d-},$$

wherein M represents a metal atom of the metal cluster, a ranging from 2 to 20, preferably from 2 to 12, and more preferably being 6, Q and X represent the ligands, Q representing a face-capping ligand or an edge-bridging ligand, preferably a face-capping ligand, b ranging from 3 to 30, preferably from 8 to 12, and more preferably being 8, X representing an apical ligand, c ranging from 2 to 50, preferably being 6, and d ranging from 1 to 12, preferably 2 to 4.

Q may be a halogen, a chalcogen or a mixture thereof. Halogen group comprises fluorine (F), chlorine (Cl), bromine (Br), iodine (I), astatine (At), or a mixture thereof. Among the halogens, fluorine (F), chlorine (Cl), bromine (Br), iodine (I) and a mixture thereof are preferred. The most preferred halogens are chlorine (Cl), bromine (Br), iodine (I) and a mixture thereof. More preferably, Q is bromine (Br). Chalcogen group comprises oxygen (O), sulphur (S), selenium (Se), tellurium (Te), polonium (Po), livermorium (Lv) or a mixture thereof. Among the chalcogens, oxygen (O), sulphur (S), selenium (Se), tellurium (Te) or a mixture thereof are preferred. The most preferred chalcogen is selenium (Se).

Advantageously, Q is a halogen or selenium (Se); notably is chlorine (Cl), bromine (Br), iodine (I) or selenium (Se).

X may be chosen from the group consisting of fluorine (F), chlorine (Cl), bromine (Br), iodine (I), astatine (At), carbon (C), nitrogen (N), sulphur (S), boron (B), oxygen (O), hydrogen (H), cyano (CN), carboxylate and mixtures thereof.

"Carboxylate" means, in the present invention, a group R1-COO where R1 represents a $C_1$-$C_6$ alkyl group, notably a $C_1$-$C_3$ alkyl group, in which one or several hydrogen atoms each can be replaced by a fluorine atom. It can be in particular a $C_2F_5COO$ group.

A "$C_1$-$C_6$ alkyl", respectively "$C_1$-$C_3$ alkyl", group means a linear or branched saturated hydrocarbon chain comprising 1 to 6, respectively 1 to 3, carbon atoms.

Advantageously, X is chosen from the group consisting of fluorine (F), chlorine (Cl), bromine (Br), iodine (I), cyano (CN) and carboxylate. Notably, X is chosen from the group consisting of chlorine (Cl), bromine (Br), cyano (CN) and carboxylate (such as $C_2F_5COO$).

Notably, X can be chosen from the group consisting of fluorine (F), chlorine (CO, bromine (Br), iodine (I), astatine (At), carbon (C), nitrogen (N), sulphur (S), boron (B), oxygen (O), or hydrogen (H), or a mixture thereof. X is preferably a halogen, more preferably Br.

M is advantageously chosen from the group consisting of molybdenum (Mo), rhenium (Re), tungsten (W), tantalum (Ta), niobium (Nb) and a mixture thereof. Preferably the metal atoms are chosen from Mo, Re and W, more preferably, the metals atoms are Mo or Re, still more preferably, the metal atom is Mo. These metal atoms have the properties to be luminescent once integrated in a metal cluster, a cluster core or a cluster unit.

In one embodiment, the metal cluster anion comprises:

a metal cluster with six metal atoms, which are preferably chosen from the group consisting of Mo, Re and W, more preferably Mo and Re, still more preferably Mo, 8 face-capping ligands, which are preferably halogens, more preferably Br, and six apical ligands, which are preferably halogens, more preferably Br.

According to a particular embodiment, the metal cluster anion has the formula $[M_6Q_8X_6]^{d-}$ with M, Q and X, as defined previously.

Such a metal cluster anion has the following structure:

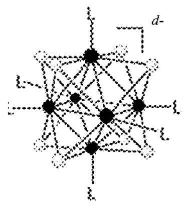

where:

● represents M,

○ represents Q, and

L represents X.

The organic cation comprises a cationic head substituted by at least one substituent including a polymerisable functional group.

Preferably, the cationic head is chosen from the group consisting of: an imidazolium, a pyridinium, a pyrolidinium, an ammonium, a phosphonium, a hydroxyphosphonium and a sulfonium. The pyrolidinium, the ammonium, the phosphonium, the hydroxyphosphonium and the sulfonium can eventually be substituted by one or two $C_1$-$C_3$ alkyl groups. The imidazolium can also be substituted by one or two $C_1$-$C_3$ alkyl groups.

More preferably the cationic head is chosen from the group consisting of: an imidazolium, a pyridinium, a pyrolidinium, and an ammonium; and notably is an imidazolium or an ammonium, where the imidazolium can be substituted (in particular on one nitrogen atom) by one $C_1$-$C_3$ alkyl group, such as methyl, and the ammonium can be substituted by one or two $C_1$-$C_3$ alkyl groups. In particular, the cationic head is an ammonium which can be substituted by one or two $C_1$-$C_3$ alkyl groups, such as methyl groups, or an imidazolium which can be substituted (in particular on one nitrogen atom) by a $C_1$-$C_3$ alkyl group, such as methyl. Still more preferably, the cationic head is an ammonium substituted by two $C_1$-$C_3$ alkyl groups, such as methyl groups, or an imidazolium substituted (in particular on one nitrogen atom) by a $C_1$-$C_3$ alkyl group, such as methyl.

According to a particular embodiment, the cationic head is an ammonium, the ammonium can be further substituted by one or two $C_1$-$C_3$ alkyl groups. Still more preferably, the cationic head is an ammonium substituted by two methyl groups.

The substituent may comprise a terminal part and a linker. In this case, the linker has from 1 to 30 methylene groups, preferably 1 to 12, such as 8 to 12 methylene groups. Longer chains enhance mobility. The terminal part is the polymerisable functional group. The linker links the terminal part to the cationic head.

A "methylene" group means, in the present invention, a $—CH_2—$ group. At least one of the methylene groups of the linker may be replaced by one or more atoms or groups of atoms chosen from the group consisting of aromatic rings, —O—, —CO—, —S—, —CH═CH—, —C≡C—, —COO—, —OC(O)—, —CH═N—, —CH═N—, —C(O)NH—, —N═N—, —NH—CO— and mixtures thereof. According to a particular embodiment, one methylene group can be replaced by —OC(O)—. More preferably, the methylene group that is replaced is the one closest to the terminal part. At least one hydrogen atom of the linker may further be replaced by a fluorine atom. The number of replacing fluorine atoms equals the number of the replaced hydrogen atoms.

An "aromatic ring" means, in the present invention, an aromatic hydrocarbon group comprising preferably 6 to 10 carbon atoms and comprising one or more fused rings, such as, for example, a phenyl or naphtyl group. Advantageously, it will be a phenyl group.

The polymerisable functional group may be chosen from the group consisting of: double carbon-carbon bond, triple carbon-carbon bond, an azide function ($—N_3$), a methacrylate function ($—OC(O)—C(CH_3)═CH_2$), an acrylate function ($—OC(O)—CH═CH_2$), an amine function ($—NH_2$), a carboxylic function ($—CO_2H$), an aldehyde function (—CHO), a hydroxyl function (—OH), an alkoxy function (—OR2 with R2=$C_1$-$C_6$ alkyl), an iodine atom (—I), a bromine atom (—Br) and a chlorine atom (—Cl).

A "double carbon-carbon bond" means, in the present invention a group —CR3═CR4R5, where R3, R4 and R5 represent, independently of each other, a hydrogen atom or a $C_1$-$C_6$ alkyl group.

A "triple carbon-carbon bond" means, in the present invention a group —C≡CR6, where R6 represents a hydrogen atom or a $C_1$-$C_6$ alkyl group.

Acrylate, methacrylate, double carbon-carbon bond or triple carbon-carbon bond are preferred for radical polymerisation with the polymers or monomers of the polymer matrix. Triple carbon-carbon bond and azide function are preferred for Huisgen coupling reactions with the polymers or monomers of the polymer matrix. Amine, carboxylic functions are preferred for polyamide synthesis, i.e. Nylon 6-6. Hydroxyl, alkoxy functions, bromine and chloride atoms are preferred for anionic polymerisation with the polymers or monomers of the polymer matrix.

Preferably, the polymerisable functional group is a double carbon-carbon bond (such as —CH═$CH_2$), a methacrylate function (—OC(O)—C($CH_3$)═$CH_2$), an amine function (—$NH_2$) or a hydroxyl function (—OH).

According to a particular embodiment, the polymerisable functional group is a double carbon-carbon bond.

The cationic head may be further substituted by a second substituent containing from 1 to 30 methylene groups, preferably from 1 to 15, more preferably from 8 to 15, such as 12. At least one of the methylene group of the second substituent may be replaced by one or more atoms or groups of atoms chosen from the group consisting of aromatic rings, —O—, —CO—, —S—, —CH═CH—, —C≡C—, —COO—, —OC(O)—, —CH═N—, —CH═N—, —C(O)NH—, —N═N—, —NH—CO— and mixtures thereof. At least one hydrogen atom of the second substituent may further be replaced by a fluorine atom.

The second substituent can thus be a group of formula -A-H where A is a chain of 1 to 30 methylene groups, preferably from 1 to 15, more preferably from 8 to 15, notably 10 or 11. At least one of the methylene group of the second substituent may be replaced by one or more atoms or groups of atoms chosen from the group consisting of aromatic rings, —O—, —CO—, —S—, —CH═CH—, —C≡C—, —COO—, —OC(O)—, —CH═N—, —CH═N—, —C(O)NH—, —N═N—, —NH—CO— and mixtures thereof. At least one hydrogen atom of the second substituent may further be replaced by a fluorine atom. Preferably, no methylene group or hydrogen atom is replaced by another group or atom.

The second substituent can be a $C_1$-$C_{30}$ alkyl group, such as a $C_1$-$C_{15}$ alkyl group, notably a $C_{10}$-$C_{15}$ alkyl group.

In a first particular embodiment, the organic cation comprises a head which is an ammonium, preferably substituted by one or two $C_1$-$C_3$ alkyl group, more preferably substituted by two methyl groups, a linker having 1 to 12 methylene groups, preferably 8 to 12 methylene groups, more preferably 11 methylene group, at least one of the methylene group can be further replaced by —O—CO—, preferably the one closest to the terminal part, and the terminal part is a double C—C bond, such as —C($CH_3$)═$CH_2$. The ammonium can be further substituted by one $C_1$-$C_{15}$ alkyl group such as a undecyl or dodecyl group.

In a second particular embodiment, the organic cation has a head which is an ammonium, preferably substituted by one or two $C_1$-$C_3$ alkyl groups such as by two methyl groups and one $C_1$-$C_{15}$ alkyl group such as a undecyl or dodecyl group, a linker having 1 to 15 methylene groups, preferably 8 to 12 methylene groups, more preferably 11 methylene groups, and the terminal part is a methacrylate function (—OC(O)—C($CH_3$)═$CH_2$).

In a third particular embodiment, the organic cation has a head which is an ammonium, preferably substituted by one or two $C_1$-$C_3$ alkyl group groups such as by two methyl groups and one $C_1$-$C_{15}$ alkyl group such as a undecyl or dodecyl group, a linker having 1 to 15 methylene groups, preferably 1 to 10 methylene groups, more preferably 1 to 5 methylene groups, such as 3 methylene groups, and the terminal part is an amine function (—$NH_2$) or a hydroxyl function (—OH).

In a fourth particular embodiment, the organic cation has a head which is an imidazolium, preferably substituted by one $C_1$-$C_3$ alkyl group, more preferably substituted by one methyl group, in particular on a nitrogen atom, a linker having 1 to 15 methylene groups, preferably 8 to 12 methylene groups, such as 9 methylene groups, and the terminal part is a double C—C bond, such as —CH═$CH_2$.

More in particular, the organic cation of the luminescent salt may have the following formula:

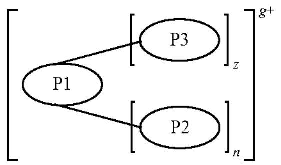

wherein P1 represents the cationic head chosen from the group consisting of an imidazolium, a pyridinium, a pyrolidinium, an ammonium, a phosphonium, a hydroxyphosphonium or a sulfonium;

wherein P2 and P3 are substituents of P1, z ranging from 0 to 12, preferably from 1 to 3, notably 1; n ranging from 1 to 12, preferably 1 or 2; and g ranging from 1 to 4, preferably 1;

wherein P2 comprises a terminal part and a linker having from 1 to 30 methylene groups, the terminal part being the polymerisable functional group and the linker linking the terminal part to the cationic head, wherein P3 contains from 1 to 30 methylene groups.

Preferably, at least one of the methylene groups of the linker is replaced by one or more aromatic rings, —O—, —CO—, —S—, —CH═CH—, —C≡C—, —COO—, —OC(O)—, —CH═N—, —CH═N—, —C(O)NH—, —N═N—, —NH—CO— and mixtures thereof. At least one of the hydrogen atoms of the linker may also be replaced by a fluorine atom.

The polymerisable functional group may be chosen from the group consisting of: double carbon-carbon chemical bond, triple carbon-carbon chemical bond, an azide function, a methacrylate function, acrylate function, an amine function, a carboxylic function, an aldehyde function, a hydroxyl function, an alkoxy function, a bromine atom and a chlorine atom.

Notably, at least one of the methylene groups of P3 is replaced by one or more aromatic rings, —O—, —CO—, —S—, —CH═CH—, —C≡C—, —COO—, —OC(O)—, —CH═N—, —CH═N—, —C(O)NH—, —N═N—, —NHCO— and mixtures thereof.

Thus, P1 corresponds to the cationic head as defined above, P2 is a substituent of the cationic head comprising a terminal part and a linker as defined above and P3 is a second substituent of the cationic head as defined above.

The luminescent salt may thus have the following formula:

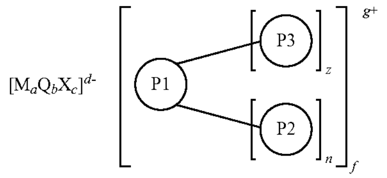

with the same definitions as stated above and where f ranging from 1 to 12 and equals to d/g.

In one particular embodiment, the metal cluster anion comprises:

- a metal cluster with six metal atoms, which are preferably chosen from the group consisting of Mo, Re and W, more preferably Mo and Re, still more preferably Mo,
- 8 face-capping ligands, which are preferably halogens, more preferably Br, and
- six apical ligands, which are preferably halogens, more preferably Br.

The organic cation of the luminescent salt of this particular embodiment can comprise a head which is an ammonium, preferably substituted by one or two $C_1$-$C_3$ alkyl group, more preferably substituted by two methyl groups, a linker having 1 to 12 methylene groups, preferably 8 to 12 methylene groups, more preferably 11 methylene group, at least one of the methylene group can be further replaced by —O—CO—, preferably the one closest to the terminal part, and the terminal part is a double C—C bond.

According to a particular embodiment, the organic cation of the luminescent salt associated to this particular metal cluster anion has:

- a head which is an ammonium, preferably substituted by one or two $C_1$-$C_3$ alkyl groups such as by two methyl groups and one $C_1$-$C_{15}$ alkyl group such as a undecyl or dodecyl group, a linker having 1 to 15 methylene groups, preferably 8 to 12 methylene groups, more preferably 11 methylene groups, and the terminal part is a methacrylate function (—OC(O)—C($CH_3$)═$CH_2$), or
- a head which is an ammonium, preferably substituted by one or two $C_1$-$C_3$ alkyl group such as by two methyl groups and one $C_1$-$C_{15}$ alkyl group such as a undecyl or dodecyl group, a linker having 1 to 15 methylene groups, preferably 1 to 10 methylene groups, more preferably 1 to 5 methylene groups, such as 3 methylene groups, and the terminal part is an amine function (—$NH_2$) or a hydroxyl function (—OH), or
- a head which is an imidazolium, preferably substituted by one $C_1$-$C_3$ alkyl group, more preferably substituted by one methyl group, in particular on a nitrogen atom, a linker having 1 to 15 methylene groups, preferably 8 to 12 methylene groups, such as 9 methylene groups, and the terminal part is a double C—C bond, such as —CH═$CH_2$.

Depending on the nature of the cluster core/unit (metal atom used, geometry, surrounding ligands), different types of properties suitable from an applicative point of view can be expected. Many metal clusters are known to have catalytic activity towards many types of reactions.

Octahedral $M_6$ clusters (with M=Mo, W or Re) are highly luminescent in the red-near infrared area (form about 550 nm to about 950 nm). From the device perspective, the broad absorption and emission bands, large Stokes shift (about 300 nm) and long excited state lifetime of these octahedral clusters provide unique engineering advantages.

Further, the luminescence lifetime can be readily monitored using phase sensitive techniques, which can be implemented using a simple phase locked loop configuration, thereby eliminating the need for a bulky optical fluorimeter.

The upstanding luminescence properties of these luminescent salts can be used for telecommunication or biomedical applications.

The metal clusters in these luminescent salts are ideal luminescent probes for detection of gaseous oxygen concentrations ranging from about 0.09% to 90% at 1 atm, and important compositional range for medical and industrial processes.

Optoelectronic and photonic components (light source, protective glasses, optic amplifier, laser source, etc.) can also advantageously comprise these metal cluster anions.

In solar cell and photovoltaic systems, it is possible to build converter layers with these metal cluster anions to increase photovoltaic yield.

In biomedical application, use of these metal cluster anions can be advantageous for in situ cells visualisation, monitoring drug relieves, etc.

As said previously, the metal cluster anions may be used as photocatalists.

Polymeric Material

A polymeric material incorporating the above luminescent salt will be described hereafter.

The polymeric material is made from two or more constituent materials with significantly different physical and/or chemical properties, which remain separate and distinct within the finished structure. In the polymeric material in question here, the polymer matrix functions as a support that can be easily shaped. The luminescent salt is used as a signal emitting element for various applications mentioned more in details here above.

The polymeric material may be obtained by mixing one or more polymers or monomers with the luminescent salt described above for subsequent polymerisation.

Polymers may be chosen from the group consisting of polyamide, polycarbonate, polyethylene, naphthalate polyethylene, terephthalate polyethylene, polyimide, polymethylmethacrylate, polystyrene, polyurethane, polycarbamate, vinylpolychloride, or a mixture thereof. The polymer can be also a hydride-terminated polydimethylsiloxane (PDMS).

Monomers may be chosen from the group consisting of amide, carbonate, ethylene, naphthalate ethylene, terephthalate ethylene, imide, methyl methacrylate, methacrylic acid, styrene, urethane, carbamate, vinyl chloride, and a mixture thereof. The monomer can be also a diol such as 1,6-butanediol, a cyanate such as hexamethylene diisocyanate (HDI), or a diamine such as hexane diamine (HAD).

According to a particular embodiment, the polymer is polymethyl methacrylate (PMMA) or the monomer is methyl methacrylate.

The polymeric material may comprise up to 100 wt. % of the luminescent salt, preferably up to 60 wt. %, more preferably up to 50 wt. %, preferably about 5 to about 50 wt. %, more preferably about 10 to about 50 wt. %. The weight percentages are given with respect to the total weight of the polymeric material.

Synthesis of a Luminescent Salt

A salt composed of an anion and the organic cation described above, referred to as a organic cation precursor, is mixed with a salt composed of a counter cation and the metal cluster anion described above, referred to as a metal cluster precursor. The luminescent salt described above is obtained through metathesis reaction between the organic cation precursor and the metal cluster precursor. The ratio of the organic cation precursor/metal cluster precursor may vary depending on the anionic charge of the metal cluster precursor. For example luminescent Rhenium clusters are tera-anionic species of formula $[Re_6Q_8L_6]^{4-}$. Their charge is counterbalanced with $Cs^+$ or $K^+$ cations but can be replaced by a polymerisable cation.

According to a particular embodiment, the anion of the organic cation precursor is a halide such as $Br^-$.

According to another particular embodiment, the counter cation of metal cluster precursor is an alkali metal cation or a hydronium ion ($H_3O^+$).

Alkali metal comprises Li, Na, K, Rb, Cs and Fr. It can be in particular K or Cs.

EXAMPLES

Examples of syntheses of a luminescent salt and a composite material according to the above description are given hereafter.

I—Synthesis of Luminescent Salts According to the Invention Compound 4

(According to SciFinder, Steps 1 and 2 were Published for the First Time in: M. Summers, J. Eastoe, S. Davis, Z. Du, R. M. Richardson, R. K. Heenan, D. Steytler, I. Grillo, Langmuir 2001, 17, 5388)

1 Esterification (Step 1)

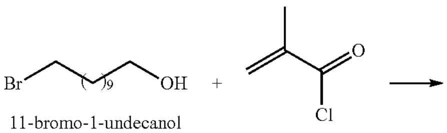

11-bromo-1-undecanol

Methacryloyl chloride

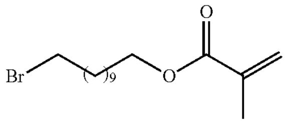

Compound 1

Methacryloyl chloride (0.92 g, 8.8 mmol) was dissolved in 10 mL dry tetrahydrofuran (THF) and added drop-wise to a stirred solution of 11-bromo-1-undecanol (2.0 g, 8.0 mmol) and triethylamine ($N(CH_2—CH_3)_3$)(0.87 g, 8.8 mmol) in 13 mL of dry THF. The mixture was stirred at 60° C. the 2.5 hours. After cooling, the precipitated triethylamine hydrochloride ($N(CH_2—CH_3)_3$·Hcl) was filtered. The product filtrate was evaporated and purified by column chromatographic in dichloromethane ($CH_2Cl_2$). Compound 1 was obtained after purification as a colourless liquid (yield: 80%).

Compound 1: $^1$-H-NMR (400 MHz, $CDCl_3$): δ (ppm)= 6.09 (d, 1H, C$\underline{H}$H═C), 5.54 (d, 1H, C$\underline{H}$H═C), 4.13 (t, 2H, —$CH_2$—O), 3.40 (t, 2H, —$CH_2$—Br), 1.94 (s, 3H, —$CH_3$—C), 1.87-1.84 (m, 2H, —C$\underline{H_2}$$CH_2$—O), 1.68-1.65 (m, 2H, —C$\underline{H_2}$—$CH_2$—Br), 1.42-1.39 (m, 14H, —$(CH_2)_7$—).

2. Quaternisation (Step 2)

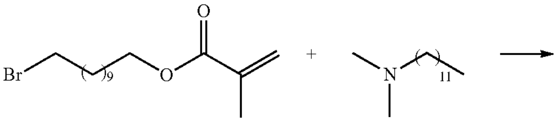

Compound 1

N,N-dimethyldodecylamine

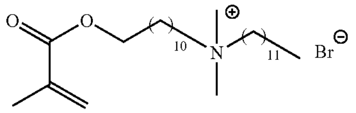

Compound 2

The obtained compound 1 (1.3 g, 4 mmol), N,N-dimethyldodecylamine and 1 mg of 2,6-di-tert-butyl-4-methylmethylphenol (as inhibitor of polymerisation) were dissolved in 13 mL of chloroform and then heated at 60° C. for 72 hours. On cooling the mixture was concentrated to 3-5 mL by vacuum and diethylether was added quickly. The clouded solution was kept at −18° C. for three days (yield: 80%).

Compound 2: $^1$-H-NMR (400 MHz, $CDCl_3$): δ (ppm)= 6.09 (d, 1H, C$\underline{H}$H═C), 5.54 (d, 1H, C$\underline{H}$H═C), 4.13 (t, 2H, —$CH_2$—O), 3.51 (t, 4H, —$CH_2$—N), 3.38 (s, 6H, $CH_3$—N), 1.94 (s, 3H, —$CH_3$—C), 1.7-1.67 (m, 4H, —(C$\underline{H_2}$—$CH_2$)$_2$N), 1.66 (m, 2H, —C$\underline{H_2}$—$CH_2$—O), 1.33-1.26 (m, 32H, —$CH_2$), 0.86 (t, 3H, —$CH_3$).

3. Metathesis with $Cs_2Mo_6Br_{14}$ (Compound 3)

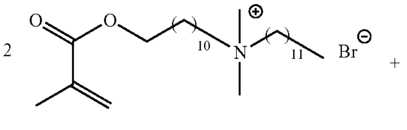

Compound 2

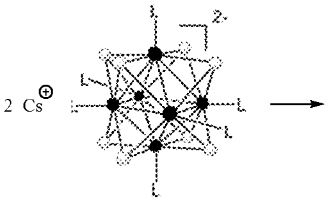

Compound 3

-continued

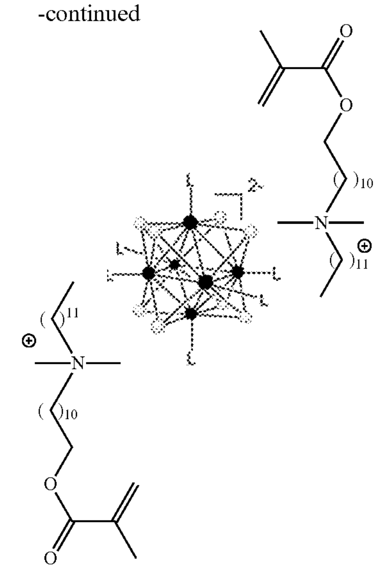

Compound 4

(In the reaction above, black beads represent Mo atoms, white beads and L represent Br atoms).

Compound 3 (1.97 g, 1 mmol) used as a metal cluster precursor was stirred in 20 mL of acetone until complete dissolution. A solution of compound 2 (1 g, 2.20 mmol) used as organic cation precursor was dissolved in dichloromethane and added drop wise to the previous solution of compound 3 and acetone. The mixture was heated for 2 hours. The CsBr formed was filtered off and the organic solution was dried under vacuum. Compound 4 was obtained as viscous oil after drying.

Compound 4: $^1$-H-NMR (400 MHz, $CDCl_3$): δ(ppm)= 6.02 (d, 2H, CHH=C), 5.48 (d, 2H, CHH=C), 4.06 (t, 4H, —$CH_2$—O), 3.20 (t, 8H, —$CH_2$—N), 3.09 (s, 12H, $CH_3N$—), 1.87 (s, 6H, —$CH_3$—C), 1.7-1.67 (m, 8H, —$(CH_2—CH_2)_2N$), 1.66 (m, 4H, —$CH_2$—$CH_2$—O), 1.24-1.16 (m, 64H, —$CH_2$—), 0.86 (t, 6H, —$CH_3$).

EDS: no caesium.

Compound 6

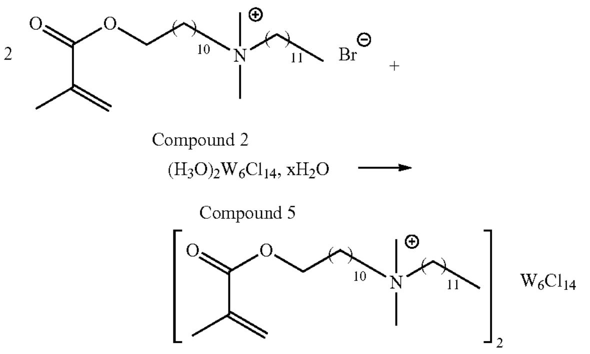

Compound 6

Compound 5 (0.38 g, 0.23 mmol) was dissolved in 5 mL of EtOH (abs). A solution of compound 2 (0.21 g, 0.5 mmol) in 10 mL of dichloromethane was added dropwise to the cluster solution. The mixture was heated for 1 hour and the solvents evaporated under vacuum. The residue was dissolved in the minimum amount of acetone and filtered through a Celite® pad. The acetone was removed under vacuum. Compound 6 was obtained as a yellow oil. Yield 95%.

Compound 6: $^1$-H-NMR (400 MHz, $CD_2Cl_2$): δ (ppm)= 5.97 (d, 2H, CHH=C), 5.48 (d, 2H, CHH=C), 4.03 (t, 4H, —$CH_2$—O), 3.15 (t, 8H, —$CH_2$—N), 3.01 (s, 12H, $CH_3N$—), 1.84 (s, 6H, —$CH_3$—C), 1.7-1.60 (m, 8H, —$(CH_2—CH_2)_2N$), 1.59 (m, 4H, —$CH_2$—$CH_2$—O), 1.31-1.20 (m, 64H, —$CH_2$—), 0.80 (t, 6H, —$CH_3$). $^{13}$-C-NMR (100 MHz, $CD_2Cl_2$): 167.5 (C=O), 136.7 (C(Me)=$CH_2$), 124.9 ($CH_2$=C), 65.1 ($CH_2O$), 64.83 ($CH_2N$), 51.9 ($CH_3N$), 31.9-22.7 ($CH_2$), 18.1 ($CH_3$ (C=$CH_2$), 13.9 ($CH_3$). Elemental analysis C58H116N2O4Cl14W6.6CH2Cl2: calc (%): C, 25.50, H, 4.28, N, 0.93. Found: C, 25.32, H, 4.24, N, 1.04.

Compound 8

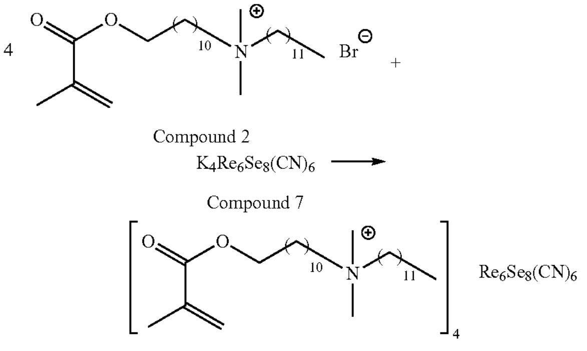

Compound 8

Compound 7 (0.4 g, 0.19 mmol) was solubilised in 5 mL of distilled water. A solution of compound 2 in dichloromethane was added dropwise to the stirred water solution. The biphasic mixture was vigorously stirred for 1 h. After that the phases were allowed to separate and the organic phase was collected and washed three times with water. The dichloromethane was removed under vacuum to afford compound 8 as a dark red solid. Yield 95%.

Compound 8: $^1$-H-NMR (400 MHz, $CD_2Cl_2$): δ(ppm)= 5.98 (d, 4H, CHH=C), 5.46 (d, 4H, CHH=C), 4.03 (t, 8H, —$CH_2$—O), 3.19 (m, 20H, —$CH_2$—N+$CH_3$—N), 1.84 (s, 12H, —$CH_3$—C), 1.7-1.60 (m, 16H, —$(CH_2—CH_2)_2N$), 1.59 (m, 8H, —$CH_2$—$CH_2$—O), 1.31-1.20 (m, 128H, —$CH_2$—), 0.80 (t, 12H, —$CH_3$). $^{13}$-C-NMR (100 MHz, $CD_2Cl_2$): 167.5 (C=O), 136.7 (C(Me)=$CH_2$), 124.6 ($CH_2$=C), 64.7 ($CH_2O$), 64.0 ($CH_2N$), 52.7 ($CH_3N$), 31.9-22.7 ($CH_2$), 18.1 ($CH_3$ (C=$CH_2$), 13.9 ($CH_3$). EDAX: no potassium, no bromide; Re, 47.45%, Se, 47.34. Elemental analysis C122H232N10O8Se8Re6.2CH2$Cl_2$: calc (%): C, 38.33, H, 6.12, N, 3.60. Found: C, 38.25, H, 6.21, N, 3.79.

Compound 11

1. Alkylation of Methylimidazole (Zhang et al J. Appl. Polym. Sci., 2001, 121, 2430)

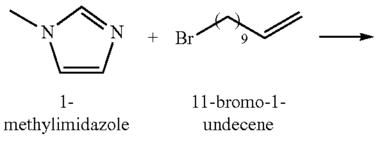

-continued

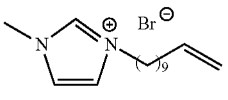

Compound 9

11-Bromo-1-undecene (2.0 g, 8.58 mmol) and 1-methylimidazole (0.59 g, 7.17 mmol) were dissolved in 25 mL of $CHCl_3$ and the solution was stirred at 50*C for 15 h. The solvent was removed under vacuum to afford a viscous liquid. The liquid was washed 5 times with a mixture cyclohexane/ethyl acetate (1:1 v/v). Compound 9 was dried under vacuum to yield a viscous colourless oil. Yield 66%.

Compound 9: $^1$-H-NMR (400 MHz, $CDCl_3$): δ(ppm)=10.17 (s, 1H, CH═N), 7.62 (s, 1H, CH═CH), 7.44 (s, 1H, CH═CH), 5.75 (m, 1H, —CH═$CH_2$), 4.91 (dd, 2H, J=24.4, 13.6 Hz, —CH═CHH), 4.31 (t, 2H, J=7.4 Hz, —$CH_2$—N), 4.28 (s, 3H, $CH_3$—N), 2.00 (q, 2H, J=6.8 Hz, —$CH_2$—), 1.82 (m, 2H, —$CH_2$—) 1.24-1.17 (m, 12H, —$CH_2$—). ESI-MS (m/z): 235.21. Elemental analysis for C15H27N2Br.0.5$H_2$O: calc (%): C, 55.55, H, 8.70, N, 8.64. Found: C, 55.37, H, 8.83, N, 8.61.

2. Metathesis with $Cs_2Mo_6I_8(C_2F_5COO)_6$ (Compound 10)

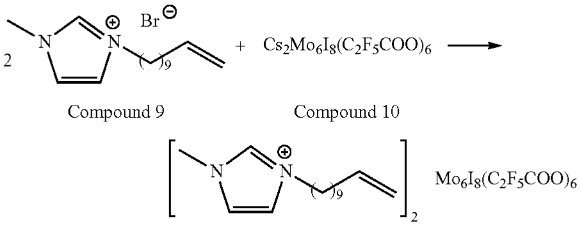

Compound 9 Compound 10

Compound 11

The cluster precursor, compound 10, (2 g, 0.70 mmol) was dissolved in 20 mL of dry acetone. A solution of the imidazolium salt, compound 9, (0.45 g, 1.4 mmol) in 5 mL of dry acetone was added to the solution of cluster. The mixture was stirred at room temperature for 1 h. After that the acetone was evaporated in a rotary evaporator and the mixture was dissolved in dichloromethane. This solution was filtered through a Celite® pad. Evaporation of solvent lead to compound 11 as an orange-red viscous liquid. Yield 97%.

Compound 11: $^1$-H-NMR (400 MHz, acetone-$d_6$): δ(ppm)=
8.74 (s, 2H, CH═N), 7.23 (s, 4H, CH═CH), 5.71 (m, 2H, —CH═$CH_2$), 4.88 (dd, 4H, J=27.3, 13.4 Hz, —CH═CHH), 4.10 (t, 4H, J=7.4 Hz, —$CH_2$—N), 3.88 (s, 6H, $CH_3$—N), 1.95 (q, 4H, J=7.0 Hz, —$CH_2$—), 1.80 (m, 4H, —$CH_2$—) 1.24-1.17 (m, 24H, —$CH_2$—). $^{19}$F-NMR: δ(ppm)=94.45 (3F), 56.84 (2F). EDS: no cesium, no bromide; Mo, 8.30%, I, 11.63%, F, 80.07% Elemental analysis for C48H54N4O12F30I8Mo6: calc (%): C, 18.97, H, 1.79, N, 1.84. Found: C, 18.71, H, 1.84, N, 1.62.

Compound 12

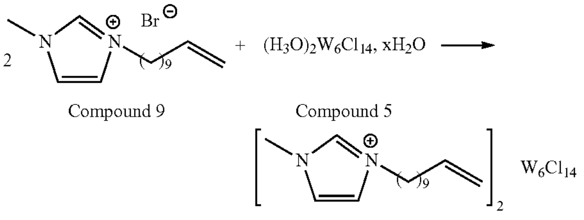

Compound 9 Compound 5

Compound 12

Compound 5 (2 g, 1.2 mmol) were dissolved in 15 mL of EtOH (abs). A solution of compound 9 (0.77 g, 2.4 mmol) in 10 mL of dichloromethane was added drop wise to the cluster solution. The mixture was heated for 1 hour and the solvents evaporated under vacuum. The residue was dissolved in the minimum amount of dichloromethane and filtered through a Celite® pad. The dichloromethane was removed under vacuum. Compound 12 was obtained as a yellow powder. Yield 92%.

Compound 12: $^1$-H-NMR (400 MHz, acetone-$d_6$): δ(ppm)=9.10 (s, 2H, CH═N), 7.82 (s, 2H, CH═CH), 7.76 (s, 2H, CH═CH), 5.81 (m, 2H, —CH═$CH_2$), 4.88 (dd, 4H, J=28.7, 13.7 Hz, —CH═CHH), 4.41 (t, 4H, J=7.3 Hz, —$CH_2$—N), 4.10 (s, 6H, $CH_3$—N), 2.07-2.01 (m, 8H, —$CH_2$—), 1.38-1.13 (m, 24H, —$CH_2$—). EDS: W, 29.21%, Cl, 64.71%, Br, 6.09%. Elemental analysis for C30H54N4Cl14W6. HBr: calc (%): C, 17.41, H, 2.63, N, 2.70. Found: C, 17.04, H, 2.57, N, 2.65.

Compound 14

1. Synthesis of hydroxy-terminated ammonium salt (Progress in Organic Coatings, 72 (2011), 305-314).

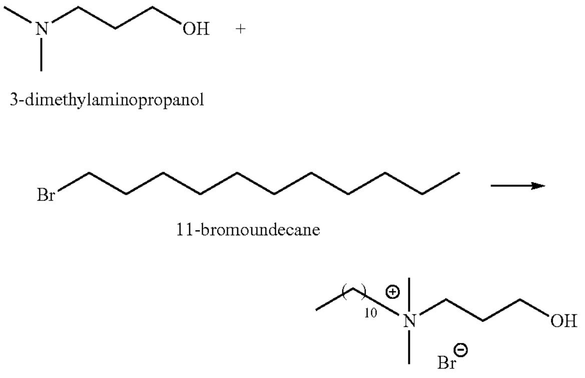

3-dimethylaminopropanol 11-bromoundecane

Compound 13

3-dimethylaminopropanol (1.55 g, 15 mmol) and 11-bromoundecane (3.06 g, 13 mmol) were mixed and refluxed at 80° C. for 30 min. The reaction mixture was cooled to room temperature and 1:3 (v/v) propanol: methanol was poured into the flask. After 12 h of reaction at 80 C, the solvents were evaporated and the product was purified by washing twice with diethyl ether. Yield 82%.

Compound 13: $^1$-H-NMR (400 MHz, $CDCl_3$): δ(ppm)=4.52 (s, 1H, OH), 3.75 (m, 4H, $CH_2$-OH+$CH_2$—N), 3.42 (m, 2H, $CH_2$—N), 3.31 (s, 6H, —$CH_3$—N), 2.18 (m, 2H, C$\underline{H}_2CH_2N$), 1.78 (m, 2H, C$\underline{H}_2CH_2N$), 1.35-1.26 (m, 16H, —$CH_2$—), 0.88 (t, 3H, —$CH_3$). [13]-C-NMR (100 MHz, $CD_2Cl_2$): 63.92 (C—O), 62.01 ($\underline{C}H_2$—N), 57.96 ($\underline{C}H_2$—N), 50.55 ($\underline{C}H_3$—N), 31.76 (—$CH_2$—), 26.23 (—$CH_2$—), 25.93 (—$CH_2$—), 13.50 (—$CH_3$). ESI-MS (m/z): 258.28. Elemental analysis for C17H38NOBr.$_{0.5}H_2O$: calc (%): C, 55.32, H, 10.74, N, 4.03. Found: C, 55.84, H, 1.61, N, 4.04.

2. Metathesis with $Cs_2Mo_6I_8(C_2F_5COO)_6$

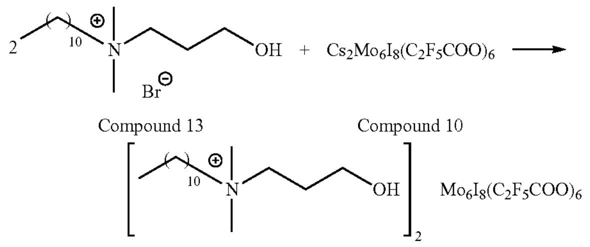

Compound 13 Compound 10

Compound 14

Compound 13 (1.2 g, 35 mmol) was dissolved in acetone. A solution in acetone of fluorinated cluster (0.5 g, 17.6 mmol) was added and the mixture stirred for 1 h. The acetone was removed and the residue was solubilised in dichloromethane and the solution filtered through Celite®. The solvent was evaporated to yield a dark orange oil. Yield=92%.

Compound 14: [1]-H-NMR (400 MHz, $CDCl_3$): δ(ppm)=3.91 (s, 2H, OH), 3.57 (m, 4H, C$\underline{H}_2$—OH), 3.53 (m, 4H, $CH_2$—N), 3.42 (m, 4H, $CH_2$—N), 3.20 (s, 12H, —$CH_3$—N), 2.08-1.70 (m, 8H, —CH2-), 1.28-1.15 (m, 32H, —$CH_2$—), 0.74 (t, 6H, —$CH_3$). $^{19}$F-NMR: δ (ppm)=94.52 (3F), 56.86 (2F).

Compound 16

1. Alkylation of the Amine

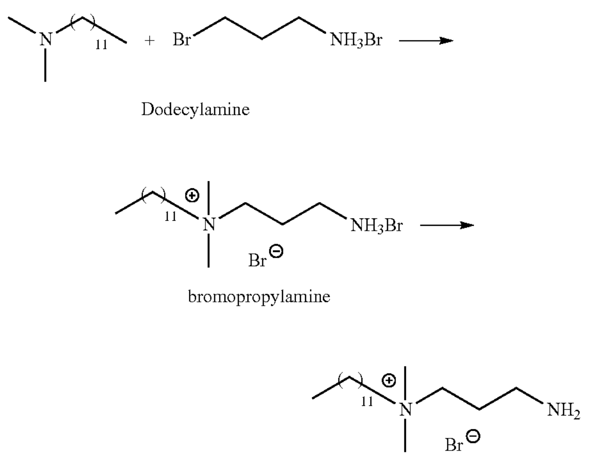

Dodecylamine bromopropylamine

Compound 15

3-Bromopropylamine (1.1 g, 5 mmol) and N,N-dimethyldodecylamine (1.1 g, 5.1 mmol) were dissolved in 12.5 mL of ethanol. The reaction was heated at reflux under Ar for 40 h. The solution was cooled down and ethylacetate was added and the compound precipitated. The white solid was filtered off and solubilised in the minimum amount of water and potassium hydroxide was added until a pH of 10. The water was evaporated and the product purified in a mixture of ethanol/THF. The solvent was evaporated and the residue solubilised in dichloromethane and precipitated in diethylether at −18° C. Yield 38%.

Compound 15: [1]-H-NMR (400 MHz, $CDCl_3$): δ(ppm)=3.83 (br, 2H, $NH_2$), 3.40-3.26 (m, 10H, C$\underline{H}_2$—N+C$\underline{H}_3$—N), 2.42 (m, 2H, C$\underline{H}_2$—$NH_2$), 1.71 (m, 2H, C$\underline{H}_2$—$CH_2$—$NH_2$), 1.30-1.20 (m, 20H, —$CH_2$—), 0.81 (t, 3H, —$CH_3$). ESI-MS (m/z): 271.3.

2. Metathesis with $Cs_2Mo_6I_8(C_2F_5COO)_6$

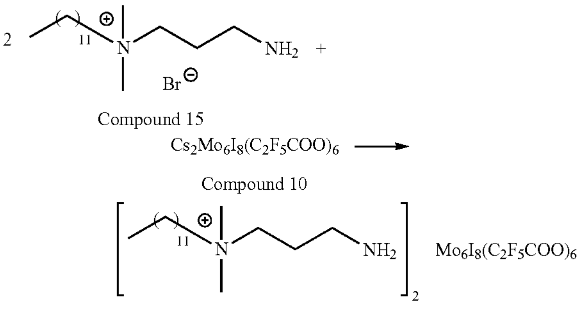

Compound 15

Compound 10

Compound 16

Compound 15 (0.25 g, 70 mmol) was solubilised in ethanol and added to a solution of compound 10 (1 g, 35 mmol) in acetone. The mixture was stirred for 1 h and the solvents evaporated. The residue was solubilised in dichloromethane and filtered through a Celite® pad. The solvent was evaporated to yield an orange solid. Yield=96%.

Compound 16: [1]-H-NMR (400 MHz, acetone-$d_6$): δ(ppm)=4.05 (br, 4H, $NH_2$), 3.90 (m, 4H, C$\underline{H}_2$—$NH_2$), 3.58 (m, 4H, C$\underline{H}_2$—N), 3.38 (s, 12H, C$\underline{H}_3$—N), 2.01-1.90 (m, 8H, C$\underline{H}_2$—$NH_2$+C$\underline{H}_2$—$CH_2$—$NH_2$), 1.41 (m, 8H, —$CH_2$—), 1.30 (m, 32H, —$CH_2$—), 0.89 (t, 6H, —$CH_3$). EDS: no cesium, no bromide; Mo, 8.30%, I, 9.67%, F, 65.3%.

II—Synthesis of Polymeric Materials According to the Invention

Synthesis of PMMA Material Containing Mo Cluster

Compound 4 was dissolved in distilled methylmethacrylate (MMA) (from 1 wt. % to 50 wt. %). Radical initiator azobisisobutyronitrile (AIBN) (0.2 wt. %) was added. The resulting solutions were sonicated at 80° C. for two hours. Then, the solutions were placed in an oven at 60° C. for 48 hours. A transparent solid composite material was obtained.

Table 1 below shows measured properties of four samples. The decomposition temperatures (Td) and weight percentage of compound 4 in the material with respect to the total weight of the resulting material, are computed by Thermogravimetric analysis (TGA) using a TGA Perkin Pyris diamond at a heating rate of 10K/min. Glass transition temperatures (Tg) were measured by differential scanning calorimetry using a NETZSCH DSC 200 F3 instrument equipped with an intracooler at heating and cooling rate of 10K/min.

TABLE 1

| Sample | Compound 4 (wt. %) | MMA (mg) | Compound 4 (mg) | $T_d$ (° C.) | $T_g$ (° C.) |
|---|---|---|---|---|---|
| CM1 | 0 | 2000 | 0 | 370 | 107 |
| CM2 | 1 | 1980 | 20 | 362 | 106 |
| CM3 | 10 | 1800 | 200 | 365 | 119 |
| CM4 | 50 | 500 | 500 | 375 | 113 |

CM1, CM2, CM3 and CM4 were all soluble in CHCl$_3$. It was attempted to incorporate 0.36 wt. % (with respect to the total weight of the resulting material) metal cluster units comprising six covalently linked polymerisable functions (apical ligands) in a PMMA matrix, the resulting material was not soluble in CHCl$_3$.

Figure 2:
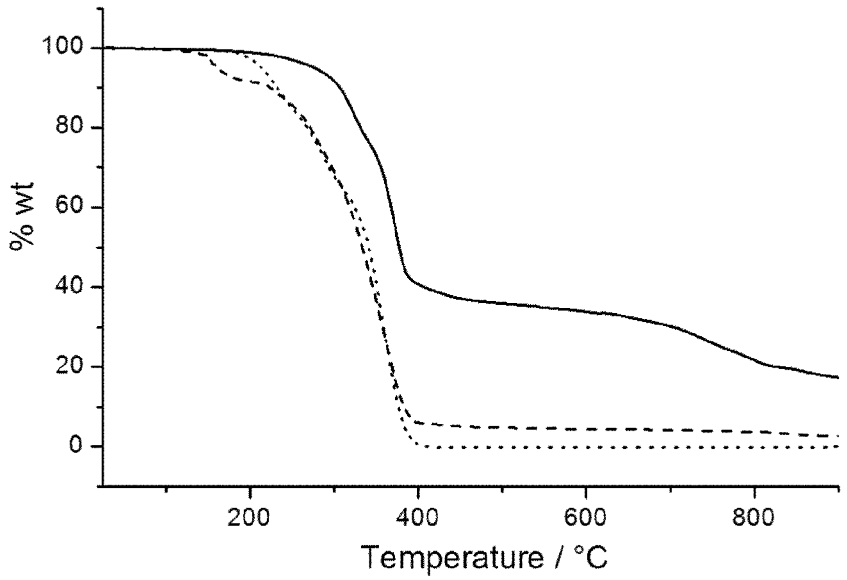
FIG. 2 represents the thermograms obtained by thermogravimetric analysis (ATG/TD Perkin Pyris Diamond) of CM4 (plain line), CM3 (dashed line) and CM2 (dotted line) of the examples under nitrogen atmosphere and illustrates the mass of the solid phase of CM4, CM3 and CM2 as a function of temperature, the mass being given as weight percentage of the initial mass.
Figure 3:
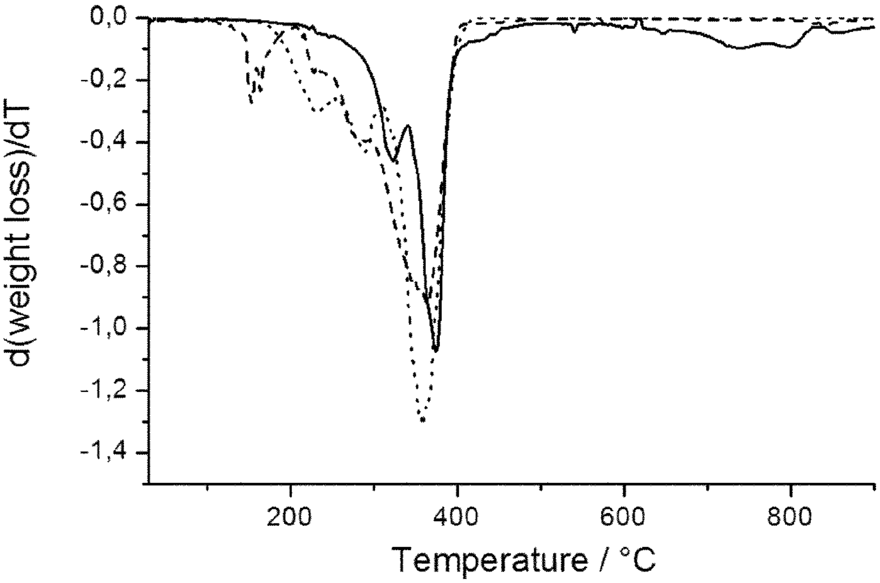
FIG. 3 represents the thermograms obtained by differential thermogravimetric analysis (ATG/TD Perkin Pyris Diamond at a heating rate of 10K/min) of CM4 (plain line), CM3 (dashed line) and CM2 (dotted line) of the examples under nitrogen atmosphere; these graphs are first derivates of the graphs of FIG. 2.

Also, as shown in FIGS. 2 and 3, the decomposition temperature is the same for all CM1 to CM4 samples and that 50 wt. % or 10 wt. % of compound 4 were effectively introduced respectively in the CM4 and CM3 polymer matrix.

Figure 4:
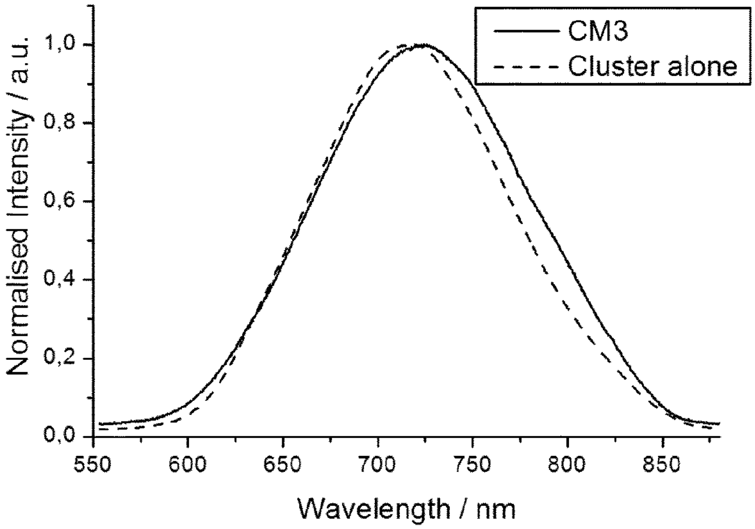
FIG. 4 represents the solid state luminescence spectra of CM3 (plain line) of the examples and of $[(n\text{-}C_4H_9)_4N]_2[Mo_6Br_{14}]$ powder (dashed line) when exposed to an illumination of 405 nm at 25° C. recorded with a Fluorolog-3™ fluorescence spectrometer (FL3-22, Horiba Jobin Yvon).

As shown in FIG. 4, and table 2 below (wherein xc indicates the wavelength at maximum of luminescence, w indicates the full width at half maximum of the luminescent peaks and R$^2$ indicates the correlation coefficient of the gaussian model of the solid state luminescence: y=y$_0$+A·exp(−0.5·((x−xc)/w)$^2$), the closest R$^2$ is to 1, the more accurate the given parameters xc and w are) the metal clusters keep their luminescence properties within the polymer matrix as compared to Cs$_2$Mo$_6$Br$_{14}$ (compound 3) powder.

TABLE 2

|  | xc | w | R$^2$ |
|---|---|---|---|
| [(n-C$_4$H$_9$)$_4$N]$_2$[Mo$_6$Br$_{14}$] | 699 | 64.35 | 0.9998 |
| CM3 | 704 | 79.36 | 0.9996 |

Synthesis of PMMA Material Containing W Cluster

Compound 6 was dissolved in acetonitrile and was added to distilled MMA (at 1 wt. % and 50 wt. %). Radical initiator AIBN (0.2 wt. %) was added. The solutions were kept for 12 h in a thermostated bath at 70° C. and then placed in the oven at 60° C. for 48 h. A transparent solid composite material was obtained.

Table 3 below shows measured properties of two samples. The decomposition temperatures (Td) and weight percentage of compound 6 in the material are computed by Thermogravimetric analysis (TGA). Glass transition temperatures (Tg) were measured by differential scanning calorimetry 10K/min. The weight average molecular weight (M$_w$) and polydispersity were measured using a set of three columns: 2×ResiPore and 1×PL gel Mixed C (Polymer Labs.). The detection system was composed of a refractometer and UV detector. Chloroform was used as eluent with flow rate of 0.8 mL min$^{-1}$. The elution profiles were analysed by the software Empower GPC module (Waters). Calculations were based on calibration curves obtained from polystyrene standards ranging from 200 g mol$^{-1}$ up to 6×10$^6$ g mol$^{-1}$. For the analysis, samples were refluxed 30 min in chloroform. The obtained solutions were filtered prior to injection.

TABLE 3

| Sample | Compound 6 (wt. %) | MMA (mg) | Compound 6 (mg) | $T_d$ (° C.) | Inorg wt % | $T_g$ (° C.) | Mw (g · mol$^{-1}$) | Polydispersity |
|---|---|---|---|---|---|---|---|---|
| CM6 | 1 | 1980 | 20 | 403 | 0.85 | 108 | 558000 | 1.1 |
| CM7 | 50 | 500 | 500 | 402 | 45 | 90.2 | — | — |

CM6 was soluble in organic solvents, i.e. CHCl$_3$ while CM7 was only partially soluble.

Synthesis of PMMA Material Containing Re Cluster

Compound 8 was dissolved in acetonitrile and was added to distilled MMA (at 1 wt. % and 50 wt. %). Radical initiator AIBN (0.2 wt. %) was added. The solutions were kept for 12 h in a thermostated bath at 70° C. and then placed in the oven at 60° C. for 48 h. A transparent solid composite material was obtained.

Table 4 below shows measured properties of two samples. The decomposition temperatures (Td) and weight percentage of compound 8 in the material are computed by Thermogravimetric analysis (TGA). Glass transition temperatures (Tg) were measured by differential scanning calorimetry 10K/min. The weight average molecular weight (M$_w$) and polydispersity were measured as described for examples CM6 and CM7.

TABLE 4

| Sample | Compound 8 (wt. %) | MMA (mg) | Compound 8 (mg) | $T_d$ (° C.) | Inorg wt % | $T_g$ (° C.) | Mw (g · mol$^{-1}$) | Polydispersity |
|---|---|---|---|---|---|---|---|---|
| CM8 | 1 | 1980 | 20 | 383 | 0.64 | 98 | 627000 | 1.1 |
| CM9 | 20 | 1800 | 200 | 394 | 40 | 99 | 583000 | 1.1 |

CM8 and CM9 were soluble in organic solvents, i.e. CHCl$_3$.

Synthesis of Polystyrene Material Containing Mo Cluster

Styrene is purified by an inhibitor column removal prior polymerisation. Compound 4 (in 1 and 50 wt. %) and styrene were solubilised in acetonitrile and AIBN (20 mg) as initiator was added. The polymerisation was held for 12 h in a thermostated bath at 70° C. and the 48 h in an oven at 60° C. An orange transparent composite was obtained.

Table 5 below shows the Tg, the Mw and polydispersity of three samples.

TABLE 5

| Sample | Compound 4 (wt. %) | Styrene (mg) | Compound 4 (mg) | $T_d$ (° C.) | Inorg wt % | $T_g$ (° C.) | Mw (g · mol$^{-1}$) | Polydispersity |
|---|---|---|---|---|---|---|---|---|
| CM10 | 0 | 1000 | 0 | 414 | 0.26 | 91.6 | 242000 | 2.45 |
| CM11 | 1 | 1980 | 20 | 445 | 0.96 | 93 | 130000 | 2.67 |
| CM12 | 50 | 500 | 500 | 432 | 38 | 34.3 | — | — |

CM10 and CM11 were soluble in organic solvents, i.e. $CHCl_3$ while CM12 was only partially soluble.

Synthesis of Polydimethylsiloxane (PDMS) Material Containing Mo Cluster

Compound 11 (at 1 and 15 wt. % (maximum) was dissolved in dry dichloromethane and to that hydride-terminated PDMS (Mn=17500) was added. Karsted's catalyst was added (20 mg) and the reaction heated at reflux for 2 days. The dichloromethane was evaporated and crude solubilised in pentane and filtered over an Acrodisc® (1 μm) filter. The pentane was evaporated to afford a transparent orange oil in the case of 1% cluster and an orange solid in the case of 15% cluster.

Table 6 below shows the composition and the Mw and polydispersity of two materials.

TABLE 6

| Sample | Compound 11 (wt. %) | PDMS (mg) | Compound 11 (mg) | Mw (g · mol$^{-1}$) | Polydispersity |
|---|---|---|---|---|---|
| CM14 | 1 | 1980 | 20 | 68000 | 1.4 |
| CM15 | 15 | 1266 | 220 | — | — |

CM14 was soluble in organic solvents, i.e. $CHCl_3$ while CM15 was only partially soluble.

Synthesis of PDMS Material Containing W Cluster

The same procedure was followed with compound 12 (1% and 10 wt. %) as precursor. A yellow oil was obtained for 1% cluster and a yellow gel for 10% cluster.

Table 7 below shows the composition and the Mw and polydispersity of two materials.

TABLE 7

| Sample | Compound 12 (wt. %) | PDMS (mg) | Compound 12 (mg) | Mw (g · mol$^{-1}$) | Polydispersity |
|---|---|---|---|---|---|
| CM16 | 1 | 1980 | 20 | 38000 | 1.1 |
| CM17 | 10 | 1266 | 236 | — | — |

CM16 was soluble in organic solvents, i.e. $CHCl_3$ while CM17 was only partially soluble.

Figure 5:
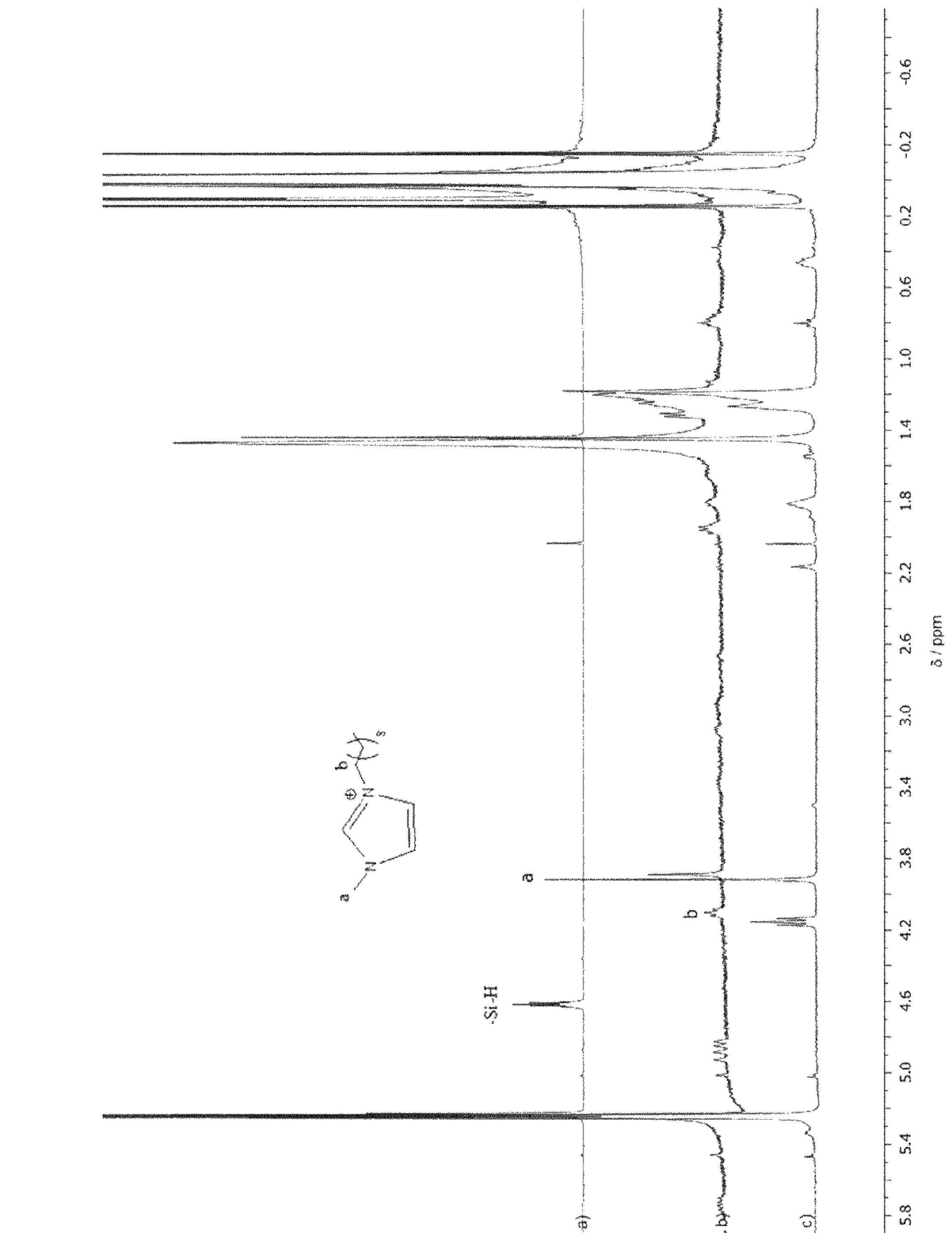
FIG. 5 represents the $^1$H-NMR of materials CM15 (b) and CM17 (c) of the examples, as well as the commercial PDMS material (a).

FIG. 5 shows the $^1$H-NMR of materials CM15 (b) and CM17 (c) as well as the commercial PDMS material (a). The disappearance of the signal at 4.65 ppm corresponding to the proton in —Si—H groups proves the complete reaction of the cluster material with the terminal hydride functions in the commercial PDMS.

Synthesis of Polyurethane Material Containing Mo Cluster

A mixture of 1,6-butanediol and compound 14 (from 1 to 50 wt. %) was heated to 50° C. to melt. To that the hexamethylene diisocyanate (HDI) was added under argon and the reaction was left for 4 h under Ar. The polymer was purified by washing with methanol twice and filtering off. The product was dried under vacuum to yield an orange solid. All materials were insoluble in common solvents but hot DMF and DMSO.

Table 8 below shows the composition of five materials as well as the $T_d$, the weight percentage of inorganic cluster calculated by TGA analysis and the $T_m$ (melting temperature) determined by DSC.

TABLE 8

| Sample | Compound 14 (wt. %) | Butanediol (mg) | Compound 14 (mg) | HDI (mg) | $T_d$ (° C.) | inorganic wt % | $T_m$ (° C.) |
|---|---|---|---|---|---|---|---|
| CM18 | 0 | 270 | 0 | 500 | 457 | 3.7 | 94 |
| CM19 | 1 | 360 | 10 | 672 | 466 | 5.7 | 137 |
| CM20 | 10 | 312 | 100 | 589 | 394 | 12.7 | 101 |
| CM21 | 20 | 310 | 220 | 592 | 432 | 17.5 | 115 |
| CM22 | 50 | 173 | 500 | 321 | 434 | 34 | 128 |

Synthesis of Nylon Material Containing Mo Cluster

Compound 16 (1 and 50 wt. %) and hexanediamine (HDA) were dissolved in dry THF. To that a solution of adipoyl chloride in THF was added dropwise. The reaction was heated at 50° C. for 12 h. The precipitate formed was filtered off and washed with water and acetone. Composites in the form of orange solid were obtained. All materials were insoluble in common solvents and water.

Table 9 below shows the composition of the materials and $T_d$ and the calculated weight of inorganic part and the $T_g$ and $T_m$ that were determined by DSC.

TABLE 9

| Sample | Compound 16 (wt. %) | HDA (mg) | Compound 16 (mg) | adipoyl chloride (mg) | $T_d$ (° C.) | Inorganic wt % | $T_g$ (° C.) | $T_m$ (° C.) |
|---|---|---|---|---|---|---|---|---|
| CM23 | 0 | 406 | 0 | 640 | 473 | 3.2 | 148 | 173 |
| CM24 | 1 | 490 | 10 | 500 | 453 | 9.3 | 135 | 171 |
| CM25 | 50 | 214 | 500 | 366 | 382 | 47 | 106 | 146 |

Figure 6:
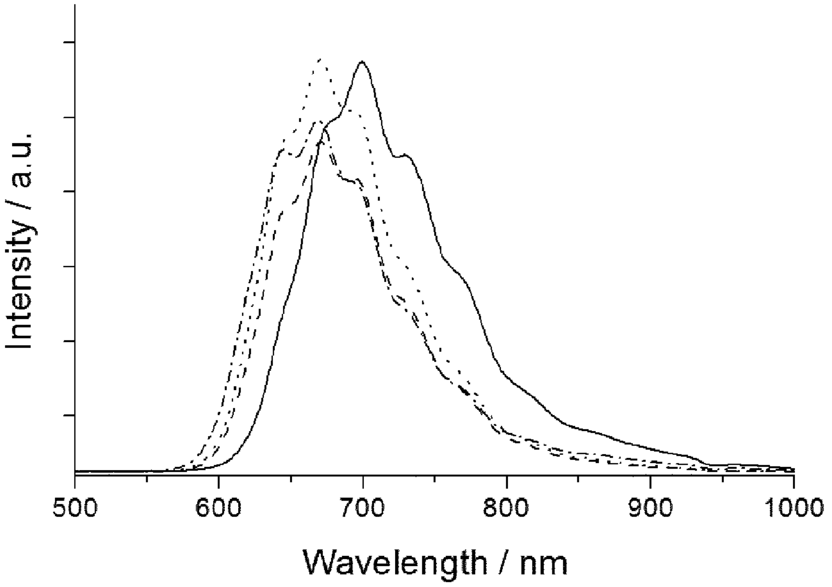
FIG. 6 shows the luminescence spectra of CM24 (plain line), CM19 (dashed line), CM2 (dotted line) and CM14 (dash-dotted line) of the examples under irradiation at 400 nm.
Figure 7:
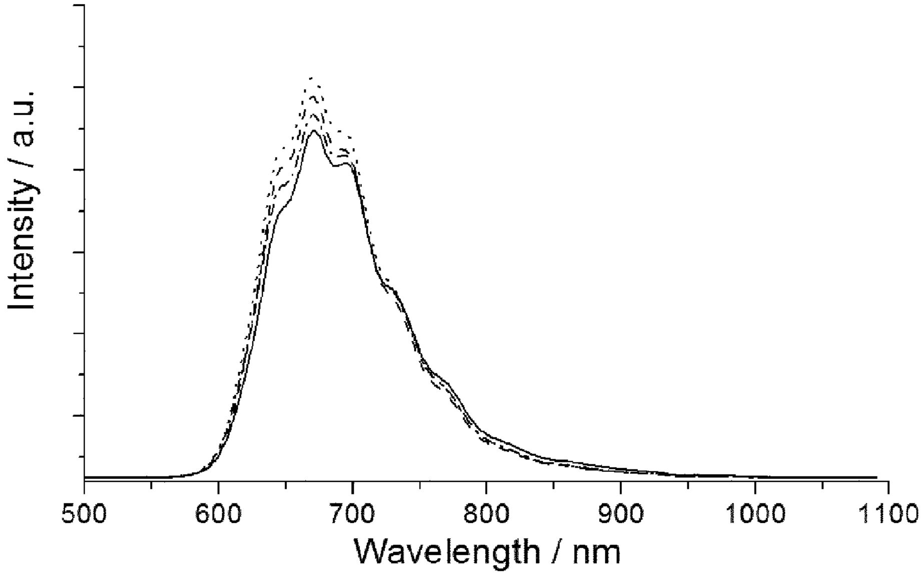
FIG. 7 shows the luminescence spectra of CM19 (dotted line), CM20 (dashed line), CM21 (dash-dotted line) and CM22 (plain line) of the examples under irradiation at 400 nm.
Figure 8:
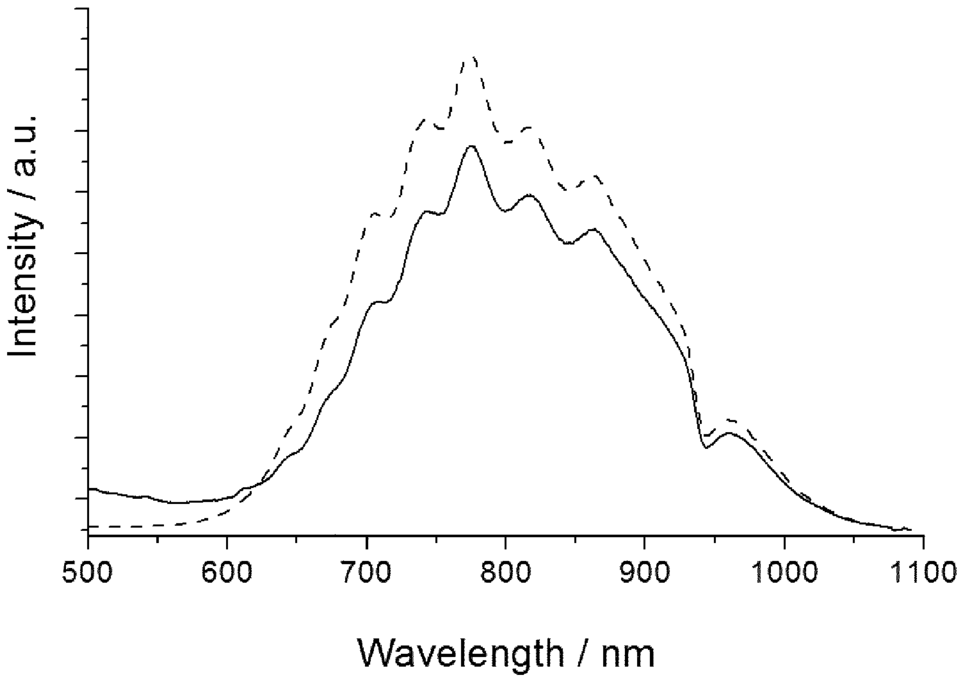
FIG. 8 shows the luminescence spectra of CM6 (plain line) and CM16 (dashed line) of the examples under irradiation at 400 nm.

The luminescence spectra under irradiation at 400 nm:

of CM24 (plain line), CM19 (dashed line), CM2 (dotted line) and CM14 (dash-dotted line) is represented on FIG. 6;

of CM19 (dotted line), CM20 (dashed line), CM21 (dash-dotted line) and CM22 (plain line) is represented on FIG. 7; and of CM6 (plain line) and CM16 (dashed line) is represented on FIG. 8.

The invention claimed is:

1. A luminescent salt comprising a metal cluster anion and an organic cation, wherein the metal cluster anion comprises a metal cluster with ligands and at least two metal atoms, the at least two metal atoms being chosen from the group consisting of molybdenum, rhenium, tungsten, thallium, niobium, and mixtures thereof, wherein the organic cation comprises a cationic head substituted by at least one substituent including a polymerisable functional group.

2. The luminescent salt of claim 1, wherein the metal cluster anion has the following formula:

$[M_aQ_bX_c]^{d-}$, wherein M represents the metal atoms of the metal cluster, a ranging from 2 to 20, Q and X represent the ligands, Q representing a face-capping ligand or an edge-bridging ligand, b ranging from 2 to 30, X representing an apical ligand, c ranging from 2 to 50, and d ranging from 1 to 12.

3. The luminescent salt of claim 2, wherein Q is a halogen, a chalcogen, or a mixture thereof.

4. The luminescent salt of claim 2, wherein X comprises at least one element chosen from the group consisting of: fluorine, chlorine, bromine, iodine, carbon, nitrogen, sulphur, boron, oxygen, hydrogen and mixtures thereof.

5. The luminescent salt of claim 1, wherein the cationic head of the organic cation is chosen from the group consisting of an imidazolium, a pyridinium, a pyrolidinium, an ammonium, a phosphonium, a hydroxyphosphonium and a sulfonium; in which said imidazolium, pyrolidinium, ammonium, phosphonium, hydroxyphosphonium or sulfonium can be further substituted by one or two C1-C3 alkyl groups.

6. The luminescent salt of claim 5, wherein the at least one substituent of the organic cation comprises a terminal part and a linker having from 1 to 30 methylene groups, the terminal part being the polymerisable functional group and the linker linking the terminal part to the cationic head.

7. The luminescent salt of claim 6, wherein at least one of the methylene groups of the linker is replaced by one or more atoms or groups of atoms chosen from the group consisting of aromatic rings, —O—, —CO—, —S—, —CH═CH—, —C≡C—, —COO—, —OC(O)—, —CH═N—, —C(O)NH—, —N═N—, —NH(CO)— and mixtures thereof.

8. The luminescent salt of claim 6, wherein at least one of the hydrogen atoms of the linker are replaced by fluorine atom.

9. The luminescent salt of claim 1, wherein the polymerisable functional group is chosen from the group consisting of: double carbon-carbon chemical bond, triple carbon-carbon chemical bond, an azide function, a methacrylate function, an acrylate function, an amine function, a carboxylic function, an aldehyde function, a hydroxyl function, an alkoxy function, an iodine atom, a bromine atom and a chlorine atom.

10. The luminescent salt of claim 5, wherein the organic cation is further substituted by a second substituent containing from 1 to 30 methylene groups.

11. The luminescent salt of claim 10, wherein at least one of the methylene groups of the second substituent is replaced by one or more atoms or groups of atoms chosen from the group consisting of aromatic rings, —O—, —CO—, —S—, —CH═CH—, —C≡C—, —COO—, —OC(O)—, —CH═N, —C(O)NH—, —N═N—, —NH(CO)— and mixtures thereof.

12. The luminescent salt of claim 10, wherein at least one of the hydrogen atoms of the second substituent is replaced by a fluorine atom.

13. The luminescent salt of claim 2, having the following formula:

$[M_aQ_bX_c]^{d-}$ 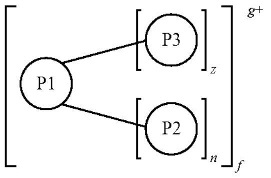

wherein P1 represents the cationic head;

wherein P2 and P3 are substituents, z ranging from 0 to 12, n ranging from 1 to 12, g ranging from 1 to 4, and f ranging from 1 to 12 and equals d/g;

wherein P1 is chosen from the group consisting of an imidazolium, a pyridinium, a pyrolidinium, an ammonium, a phosphonium, a hydroxyphosphonium or and a sulfonium, wherein P2 comprises a terminal part and a linker having from 1 to 30 methylene groups, the terminal part being the polymerisable functional group and the linker linking the terminal part to the cationic head, wherein P3 contains from 1 to 30 methylene groups.

14. The luminescent salt of claim 2, wherein a ranges from 2 to 8; b ranges from 8 to 12; c ranges from 2 to 6; and d ranges from 2 to 4.

15. The luminescent salt of claim 13, wherein z ranges from 1 to 3; and n is 1 or 2.

16. The luminescent salt of claim 13, wherein at least one of the methylene groups of the linker is replaced by one or more atoms or groups of atoms chosen from the group consisting of aromatic rings, —O—, —CO—, —S—, —CH═CH—, —C≡C—, —COO—, —OC(O)—, —CH═N—, —C(O)NH—, —N═N—, —NH(CO)— and mixtures thereof.

17. The luminescent salt of claim 13, wherein at least one of the hydrogen atoms of the linker is replaced by a fluorine atom.

18. The luminescent salt of claim 13, wherein the polymerisable functional group is chosen from the group consisting of: double carbon-carbon chemical bond, triple carbon-carbon chemical bond, an azide function, a methacrylate function, acrylate function, an amine function, a carboxylic function, an aldehyde function, a hydroxyl function, an alkoxy function, an iodine atom, a bromine atom and a chlorine atom.

19. The luminescent salt of claim 13, wherein at least one of the methylene groups of P3 is replaced by one or more atoms or groups of atoms chosen from the group consisting of aromatic rings, —O—, —CO—, —S—, —CH═CH—, —C≡C—, —COO—, —OC(O)—, —CH═N—, —C(O)NH—, —N═N—, —NH(CO)— and mixtures thereof.

20. A polymeric material comprising a polymer matrix which has polymerised with the luminescent salt of claim 1.

21. The polymeric material of claim 20, comprising up to 60 wt. % of the luminescent salt, weight percentage being given with respect to the total weight of the polymeric material.

22. The polymeric material of claim 21, comprising up to 50 wt. % of the luminescent salt, weight percentage being given with respect to the total weight of the polymeric material.

23. The polymeric material of claim 22, comprising 10 to 50 wt. % of the luminescent salt, weight percentage being given with respect to the total weight of the polymeric material.

* * * * *